(12) United States Patent
McCully

(10) Patent No.: US 7,167,274 B2
(45) Date of Patent: Jan. 23, 2007

(54) LINE LEADING FROM AN ARBITRARY POINT

(75) Inventor: Nathaniel McCully, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 875 days.

(21) Appl. No.: 09/967,865

(22) Filed: Sep. 28, 2001

(65) Prior Publication Data

US 2003/0063317 A1    Apr. 3, 2003

(51) Int. Cl.
*B41B 7/00* (2006.01)
(52) U.S. Cl. ..................... 358/1.9; 358/468
(58) Field of Classification Search .............. 358/1.9, 358/488; 400/42–46, 183
See application file for complete search history.

(56) References Cited

U.S. PATENT DOCUMENTS

| | | | |
|---|---|---|---|
| 4,284,975 A | 8/1981 | Odaka | |
| 4,291,381 A | 9/1981 | Siebeck | |
| 4,591,999 A | 5/1986 | Logan | |
| 4,608,664 A | 8/1986 | Bartlett et al. | |
| 4,833,627 A | 5/1989 | Leszczynski | |
| 4,837,729 A | 6/1989 | Funahashi | |
| 4,906,114 A * | 3/1990 | Tanaka et al. ............ | 400/17 |
| 5,003,499 A | 3/1991 | Fujiwara et al. | |
| 5,018,083 A | 5/1991 | Watanabe et al. | |
| 5,175,806 A | 12/1992 | Muskovitz et al. | |
| 5,287,443 A | 2/1994 | Mameda et al. | |
| 5,353,222 A | 10/1994 | Takise et al. | |
| 5,399,029 A | 3/1995 | Muraoka et al. | |
| 5,416,898 A | 5/1995 | Opstad et al. | |
| 5,432,890 A | 7/1995 | Watanabe | |
| 5,500,931 A | 3/1996 | Sonnenschein | |
| 5,501,538 A | 3/1996 | Sawada et al. | |
| 5,548,700 A | 8/1996 | Bagley et al. | |
| 5,579,471 A | 11/1996 | Barber et al. | |
| 5,581,670 A | 12/1996 | Bier et al. | |
| 5,617,115 A | 4/1997 | Itoh et al. | |
| 5,724,072 A | 3/1998 | Freeman et al. | |
| 5,724,596 A | 3/1998 | Lathrop | |
| 5,740,456 A | 4/1998 | Harel et al. | |
| 5,754,873 A | 5/1998 | Nolan et al. | |
| 5,778,403 A | 7/1998 | Bangs | |
| 5,802,532 A | 9/1998 | Nakayama et al. | |
| 5,803,629 A | 9/1998 | Neville et al. | |

(Continued)

FOREIGN PATENT DOCUMENTS

JP            61-282974            12/1986

(Continued)

OTHER PUBLICATIONS

U.S. Appl. No. 09/964,293, filed Sep. 25, 2001, Shade et al.

(Continued)

*Primary Examiner*—Thomas D. Lee
*Assistant Examiner*—Stephen Brinich
(74) *Attorney, Agent, or Firm*—Fish & Richardson P.C.

(57) ABSTRACT

Methods and apparatus implementing a technique for calculating line leading. In general, in one aspect, the technique includes receiving a first input specifying either a forward line leading model or a backward line leading mode and calculating line leading based on the input.

25 Claims, 7 Drawing Sheets

U.S. PATENT DOCUMENTS

| | | | |
|---|---|---|---|
| 5,805,167 | A | 9/1998 | Van Cruyningen |
| 5,809,166 | A | 9/1998 | Huang et al. |
| 5,937,420 | A | 8/1999 | Karow et al. |
| 6,088,520 | A | 7/2000 | Taoka et al. |
| 6,321,243 | B1 | 11/2001 | Ballard |
| 6,330,577 | B1 | 12/2001 | Kim |
| 6,359,630 | B1 | 3/2002 | Morse et al. |
| 6,414,698 | B1 | 7/2002 | Lovell et al. |
| 6,426,751 | B1 | 7/2002 | Patel et al. |
| 6,504,544 | B1 | 1/2003 | Hollingsworth et al. |
| 6,510,441 | B1 | 1/2003 | Kenninga |
| 6,624,814 | B1 | 9/2003 | Karow et al. |
| 6,882,441 | B1 | 4/2005 | Faust et al. |
| 6,903,839 | B1 | 6/2005 | Laverty et al. |
| 2001/0048764 | A1 | 12/2001 | Betrisey et al. |
| 2002/0062324 | A1 | 5/2002 | McCulley et al. |
| 2002/0065852 | A1 | 5/2002 | Hendrickson et al. |
| 2004/0205606 | A1 | 10/2004 | McCully |

FOREIGN PATENT DOCUMENTS

| | | | |
|---|---|---|---|
| JP | 01-125656 | | 5/1989 |
| JP | 1-271275 | | 10/1989 |
| JP | 02-213983 | | 8/1990 |
| JP | 04-052871 | | 2/1992 |
| JP | 05096806 | A * | 4/1993 |
| JP | 05-224651 | | 9/1993 |
| JP | 06-20026 | | 1/1994 |
| JP | 06-96174 | | 4/1994 |
| JP | 06-149806 | | 5/1994 |
| JP | 07-096594 | | 4/1995 |
| JP | 07-149005 | | 6/1995 |
| JP | 07-182303 | | 7/1995 |
| JP | 8-137871 | | 5/1996 |
| JP | 8-161309 | | 6/1996 |
| JP | 08-194832 | | 7/1996 |
| JP | 08-314655 | | 11/1996 |
| JP | 10-069477 | | 3/1998 |
| JP | 10-222499 | | 8/1998 |
| JP | 11-102446 | | 4/1999 |
| JP | 11-353491 | | 12/1999 |
| JP | 2000-267645 | | 9/2000 |
| JP | 2001-281835 | | 10/2001 |
| JP | 2001-297077 | | 10/2001 |
| JP | 2003-523015 | | 7/2003 |

OTHER PUBLICATIONS

Hirschberg, D.S. et al., "New Applications of Failure Functions", *Journal of the Association for Computer Machinery*, vol. 34, No. 3, Jul. 1987, pp. 616-625.

Peter Karow, "Extending Control of Digital Typography", Visible Language, 32.2, Visible Language 1998, pp. 100-127 (671001 IDS Sep. 30, 2004).

Paul Baker Typography, "Leading", URL http://web.archive.org/web/19970703182403/http://www.pbtweb.com/typostyl/leading.html, published on the Internet and by Internet Archive on Jul. 3, 1997, 2 pages.

* cited by examiner

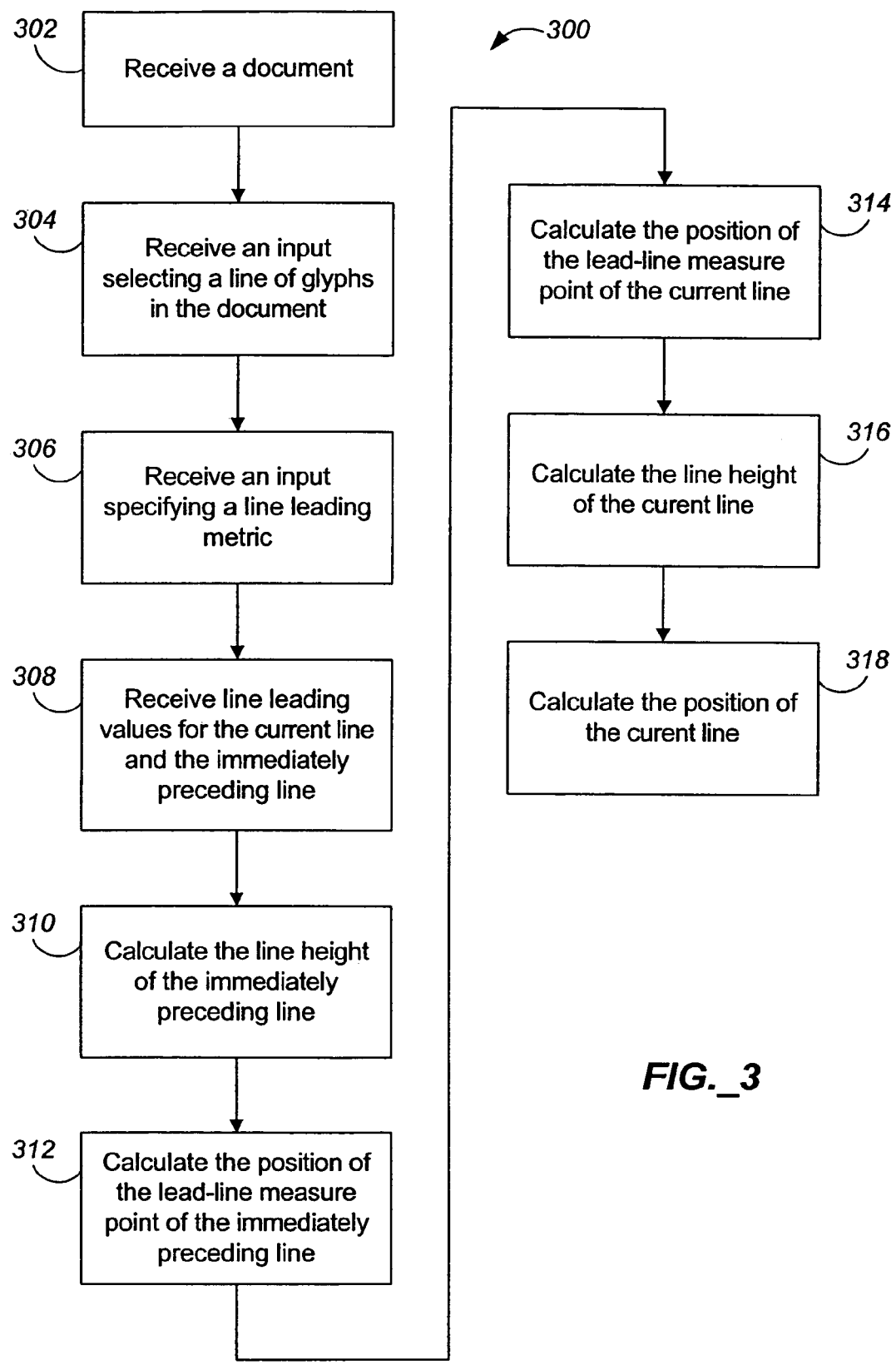
FIG._3

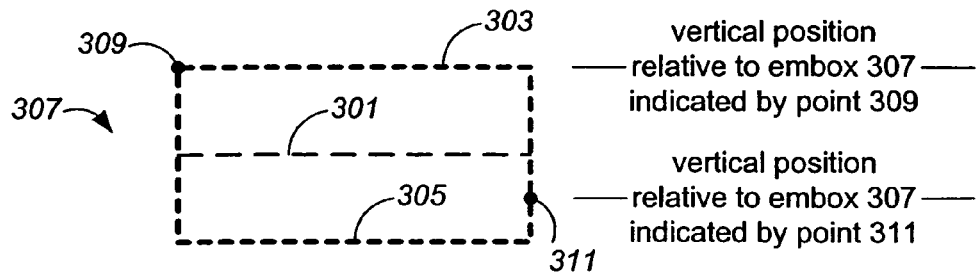
FIG._3A
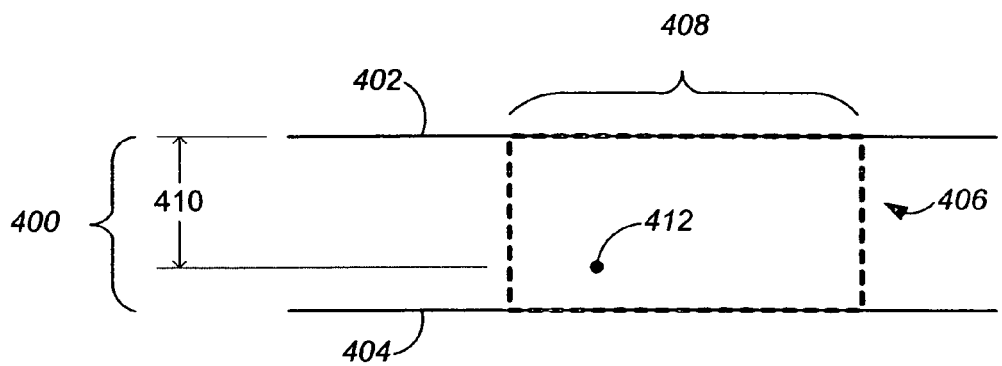
FIG._4A
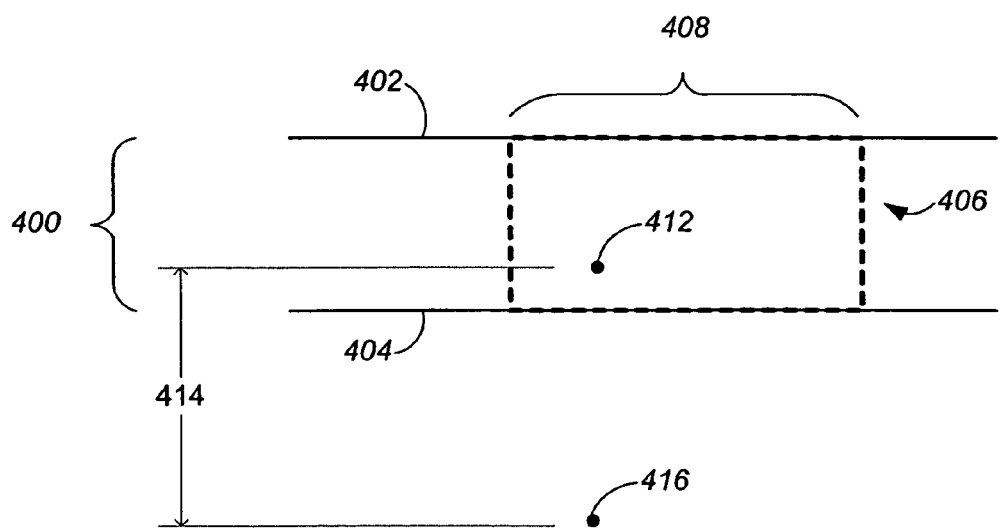
FIG._4B

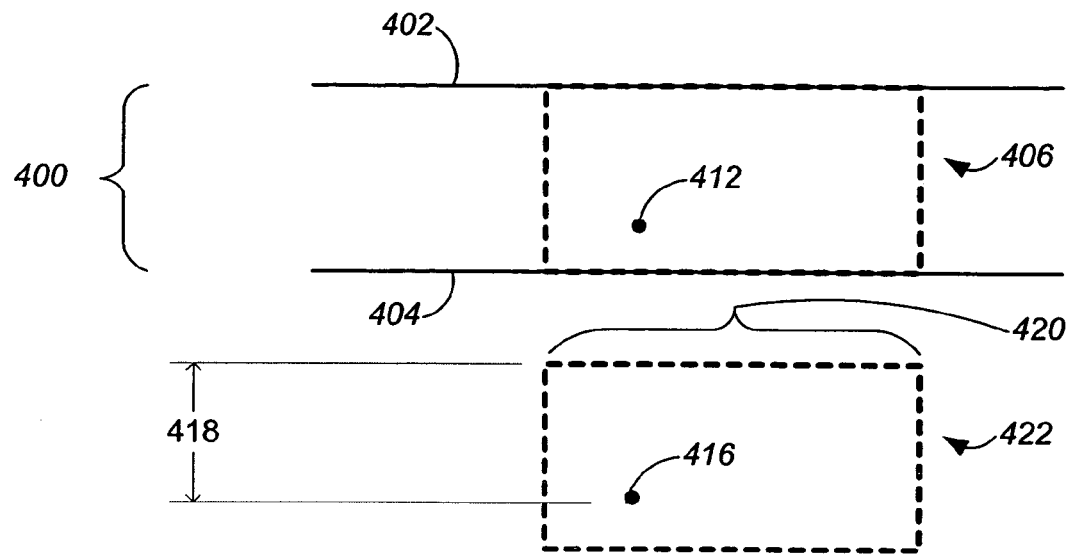
*FIG._4C*
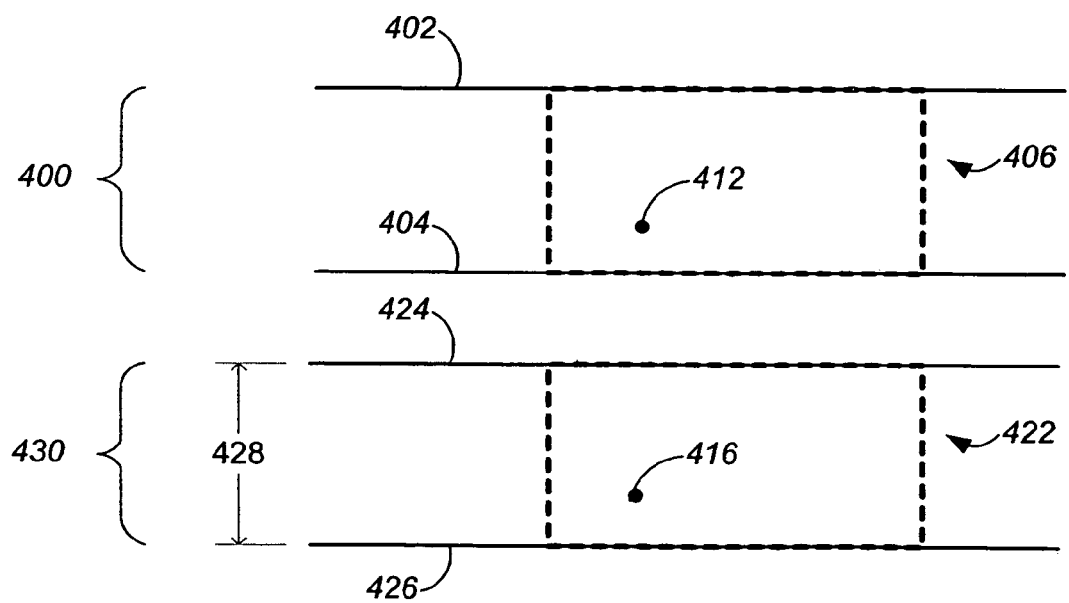
*FIG._4D*

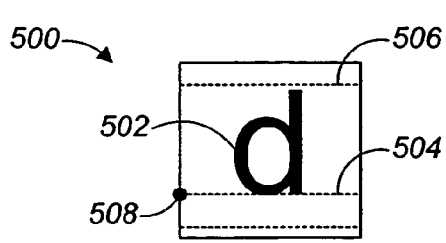
FIG._5A
(PRIOR ART)
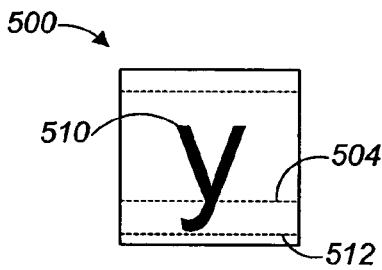
FIG._5B
(PRIOR ART)
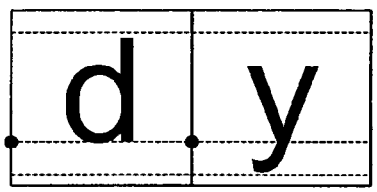
FIG._5C
(PRIOR ART)
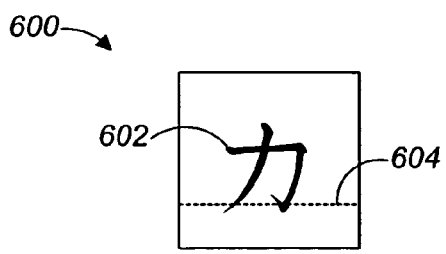
FIG._6A
(PRIOR ART)
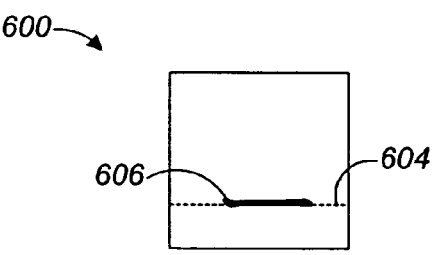
FIG._6B
(PRIOR ART)
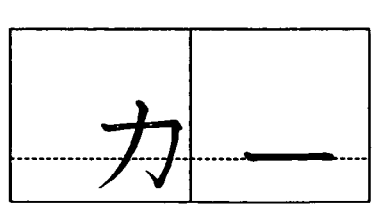
FIG._6C
(PRIOR ART)

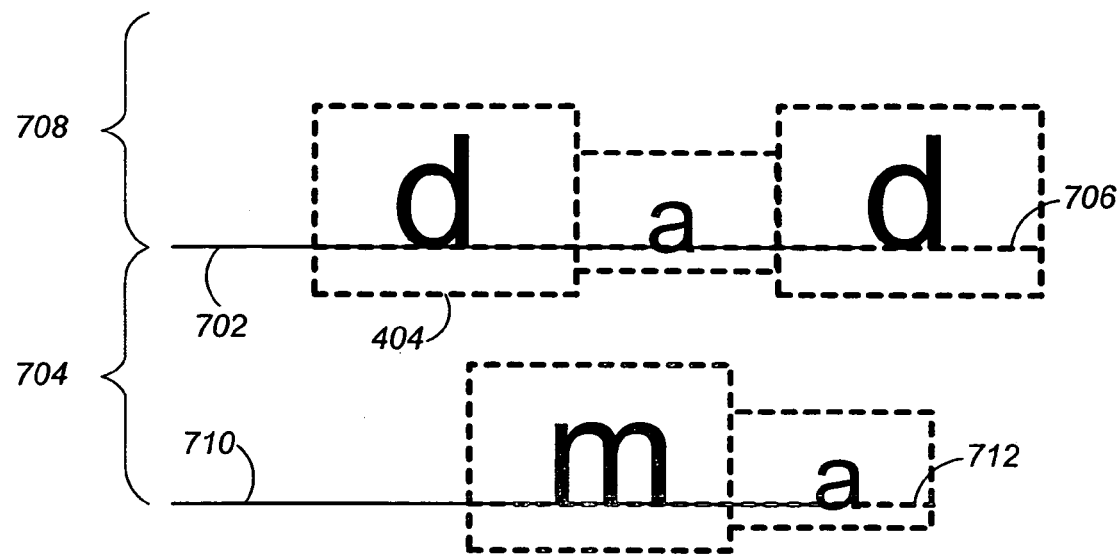
FIG._7
(PRIOR ART)
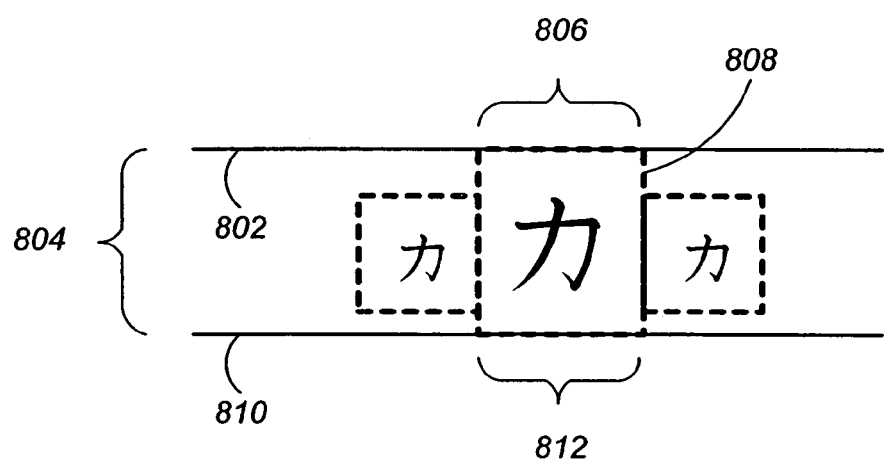
FIG._8
(PRIOR ART)

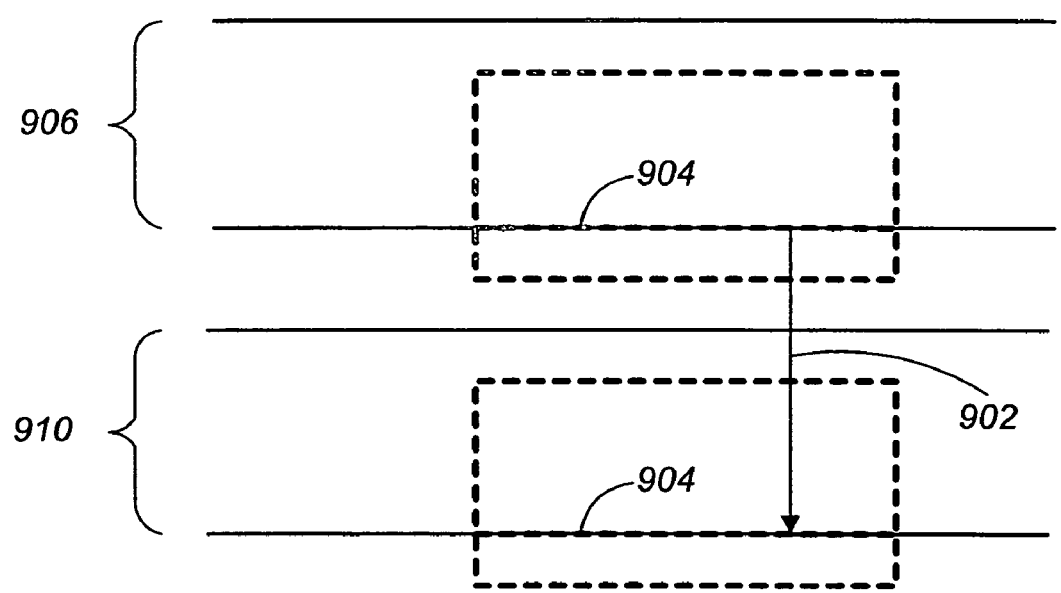
FIG._9
(PRIOR ART)

US 7,167,274 B2

LINE LEADING FROM AN ARBITRARY POINT

BACKGROUND OF THE INVENTION

The present invention relates to desktop publishing (DTP) and line leading.

DTP documents typically include multiple lines of glyphs, which usually represent characters but can also represent symbols and blank spaces. In a document, the lines of glyphs are arranged vertically, horizontally, or in some combination thereof. This arrangement can be applied to the entire document or any portion of the document.

As characters, symbol, or blank spaces are added to the document and a current line of glyphs is filled, a new line is added adjacent and parallel to the line last filled. The term line procession refers to the described manner of adding lines. A direction of the line procession is the direction in which the lines are added. For example, in a typical page of a DTP document, lines are added from the top of the page to the bottom of the page. Accordingly, the line procession direction is from top to bottom.

Glyphs are usually contained in a virtual body sometimes referred to as an embox. An embox is an outer frame around a glyph and, furthermore, has dimensions and size. The dimensions and size of the embox are determined, respectively, by the shape of the glyph and the type point of a character represented by the glyph. Generally, an embox's dimensions vary from glyph group to glyph group. Specifically, for a group of related glyphs, there is typically an embox of fixed dimensions that can frame every glyph in the group. A related group of glyphs include but is not limited to those representing characters belonging to the same font. In Chinese-Japanese-Korean ("CJK") DTP systems, the embox's dimensions match the standard escapement of mono-spaced full-width CJK ideographic characters, and thus is called a "ideographic embox". Generally, an embox's size is determined by the type size of the character represented by the glyph framed. For example, an embox framing a glyph representing a character of type size ten is smaller than one framing the same glyph representing the character of type size twelve.

Where a glyph is placed in an ideographic embox (or analogously where an embox for given a glyph is positioned) depends on the convention of the DTP system. In Roman DTP systems, the main portion of the glyph rests on a baseline. Any ascending or descending portions extend to respective ascender or descender lines. The zero point (or origin) from which a glyph is drawn is conventionally defined to be at the left edge of the base line. In Roman convention, this zero point determines the position of a glyph in an embox. FIG. 5A shows an example of an embox 500 framing a glyph 502 that represents the character "d". The main portion of the glyph rests on the baseline 504 and the ascending stem extends to the ascending line 506. The zero point 508 is located as shown. FIG. 5B shows another example of the embox 500 framing a glyph 510 that represents the character "y". The main portion of the glyph rests on baseline 504 and the descending stem extends to descending line 512. As evident from FIG. 5C, the glyphs 502 and 510 can be lined up in a row by arranging their emboxes so that their base lines form are colinear.

In CJK DTP systems, although there is usually a baseline and a zero point in an embox, the glyphs representing the ideographical characters are positioned at an arbitrary point relative to the zero point. To perform correct Japanese typography with digital fonts defined according to the described Roman convention, it is necessary to calculate where the ideographic embox rests relative to the zero point (i.e., the Roman baseline). For example, some fonts are designed so their ideographic characters rest 88% above the Roman baseline and 12% below. In such a font, the ideographic embox is thus defined as having 12% of its height below the baseline.

FIG. 6A shows an example of an embox 600 framing a glyph 602 representing an ideographic character. The position of the glyph 602 with respect to the embox 600 is determined by the specified percent above the baseline 604, which unlike those in the Roman DTP systems, is not necessarily universally located at the same place in the embox. That is, in CJK DTP systems, the location of the baseline 604 is arbitrary and can vary. In this case, approximately 88 percent of the glyph 602 is above the baseline 604. FIG. 6B shows an example of the embox 600 framing another glyph 606, which is positioned using the 88 percent criteria. As evident from FIG. 6C, the glyphs 602 and 606 do not line up in a row by arranging their emboxes so that their baselines form a straight line.

How lines of glyphs are defined in a DTP system also depends on the convention of the DTP system. A line of glyphs usually includes a top line and a bottom line. Roman DTP systems set the bottom line of a current line of glyphs to coincide with the baseline of the emboxes in the current line of glyphs. The top line of the current line of glyphs is set to coincide with the baseline of emboxes in the previous line of glyphs. This convention ensures that the glyphs in a line of glyphs are line up properly.

FIG. 7 shows an example of the Roman line definition. As shown, the top line 702 of a line of glyphs 704 is defined to coincide with the baseline 706 of the emboxes in the previous line of glyphs 708. The bottom line 710 of the line of glyphs 704 is defined to coincide with the baseline 712 of the emboxes in the line of glyphs 704.

CJK DTP systems cannot use the technique described in the preceding paragraphs to ensure proper glyph alignment because, as discussed, CJK glyphs are positioned at an arbitrary point relative to the zero point. CJK DTP systems set the top line of a current line of glyphs to coincide with the top edge of a largest embox in the current line of glyphs. The bottom line of the current line of glyph is set to be the bottom of the largest embox. Aligning CJK and Roman glyphs is further described in PCT Application No. US0104499, entitled "Method for Determining Line Leading", filed on Feb. 12, 2001, which is hereby incorporated by reference in its entirety. Aligning CJK and Roman glyphs is also further described in U.S. application Ser. No. 09/782, 597, entitled "Method for Calculating CJK Emboxes in Fonts", filed on Feb. 12, 2001, which is hereby incorporated by reference in its entirety.

FIG. 8 shows an example of the CJK line definition. As shown, the top line 802 of a line of glyphs 804 is defined to coincide with the top edge 806 of the largest embox 808 in the line of glyphs 804. The bottom line 810 of the line of glyphs 804 is defined to coincide with the bottom edge 812 of the largest embox 808. Additionally, there may be spacing, referred to as Aki, between adjacent lines. To ensure proper alignment, CJK DTP systems typically position a glyph at the center of the embox and align emboxes in a line of glyphs by their embox centers.

Line leading refers to the distance between adjacent lines of glyphs. Most DTP systems measure line leading the same way for both Roman and CJK conventions. Specifically, the line leading is measure from the baseline of a current line of glyphs to the baseline of an immediately preceding line of glyphs. FIG. 9 shows an example of the Roman line leading model. Unfortunately, this line leading model can result in unaesthetic line placement when applied to the CJK DTP systems. As shown, line leading, depicted as a ray 902, is measured from the baseline 904 in the current line of glyphs 906 to the baseline 908 in the previous line of glyphs 910. One problem caused by using the Roman line leading model in CJK DTP systems is that, as discussed, the CJK line definition is not the same as the Roman line definition. Forcing the Roman line leading model onto CJK DTP systems usually results in irregular distances between lines of glyphs mostly because, as discussed, these systems define lines differently and the CJK system positions glyphs at an arbitrary point relative to the zero point.

SUMMARY OF THE INVENTION

The present invention provides methods and apparatus, including computer program products stored on machine-readable medium, for calculating line leading from an arbitrary point.

In general, in one aspect, the present invention provides a method for calculating a position of a current line of glyphs relative to an immediately preceding line of glyphs. The method includes receiving a document containing lines of glyphs. Each line of glyphs includes at least one glyph. Each glyph is contained in an embox having a preceding edge and a following edge. The embox has a size determined by a type size of a character represented by the glyph. A line of glyphs includes: a preceding line defined to coincide and be parallel with the preceding edge of a largest embox of the line of glyphs; a following line defined to coincide and be parallel with the following edge of the largest embox of the line of glyphs; and a line height defined to be a distance between the preceding line and the following line of the line of glyphs. The method includes receiving an input specifying a line leading metric, which represents a reference point relative to an embox. The method includes receiving a line leading value for the current line of glyphs and a line leading value for the immediately preceding lines of glyphs. The method includes calculating the line height of the immediately preceding line of glyphs. The method includes calculating a position of a line leading measure point of the immediately preceding line of glyphs from the line leading metric and from the line height of the immediately preceding line of glyphs. The method includes calculating a position of a line leading measure point of the current line of glyphs from one of the line leading values received and from the calculated position of the line leading measure point of the immediately preceding line of glyphs. The method includes calculating the line height of the current line of glyphs and further includes calculating the position of the current line of glyphs from the line leading metric, the line height of the current line of glyphs, and the calculated position of the line leading measure point of the current line of glyphs.

The invention can be implemented to realize one or more of the following advantages. A DTP system in accordance with the invention is flexible and accommodates both Roman and CJK DTP systems. The system can calculate line leading from a arbitrary point selectable by a user, including the center of an embox. The system is flexible and can use either a forward or backward line leading model.

The details of one or more implementations of the invention are set forth in the accompanying drawings and the description below. Other features and advantages of the invention will become apparent from the description, the drawings, and the claims.

BRIEF DESCRIPTION OF THE DRAWINGS

FIG. 3 shows a method in accordance with the invention for calculating line leading.

FIG. 3A shows one implementation of a line leading metric.

FIGS. 4A–D illustrates one implementation of the method of FIG. 1.

FIGS. 5A–C show emboxes of the Roman DTP convention.

FIGS. 6A–C show emboxes of the CJK DTP convention.

FIG. 7 shows an example of the Roman line definition.

FIG. 8 shows an example of the CJK line definition.

FIG. 9 shows the Roman line leading model.

Like reference symbols in the various drawings indicate like elements.

DETAILED DESCRIPTION

The following discussion deals mainly with horizontal typesetting, but it should be noted that the inventive line leading technique can be applied to both horizontal typesetting and to vertical typesetting.

Figure 1:
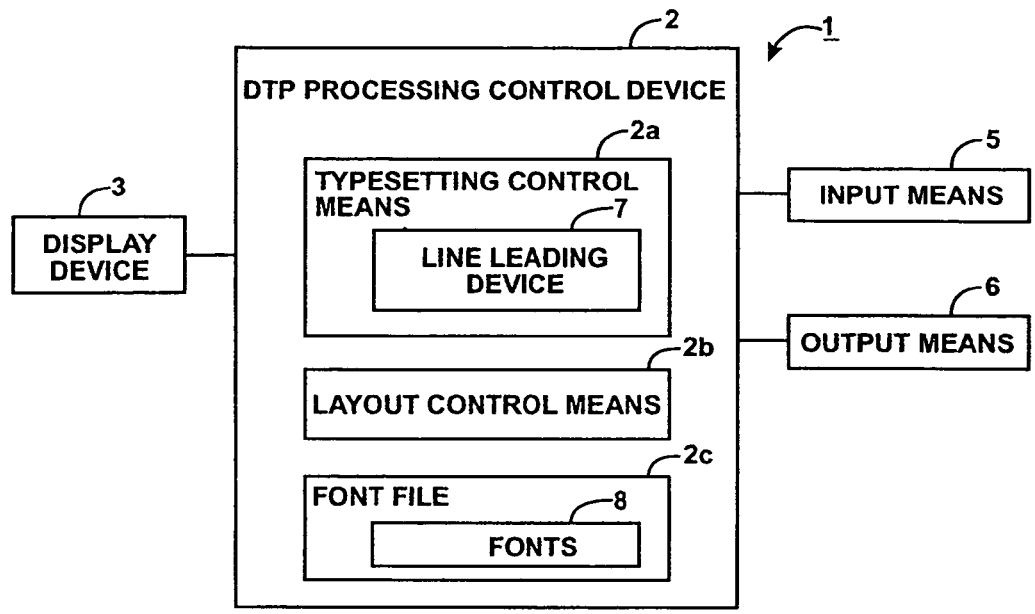
FIG. 1 shows a DTP system in accordance with the invention.

FIG. 1 shows an electronic typesetting DTP system 1 in accordance with one implementation of the invention. The DTP system 1 has a DTP processing control device 2, for performing electronic typesetting and layout editing and so forth, a display device 3 for displaying the data being processed, an input device 5 for inputting various types of data such as but not limited to graphics, text, control instructions, and an output device 6 for outputting processed data. The DTP processing control device 2 includes typesetting control device 2a, which controls typesetting, layout control device 2b, which controls layout editing, and font file 2c, which stores font information about attributes of the text to be output on a display or printed. In particular, font file 2c includes Roman fonts and CJK fonts 8, which are fonts for ideographic characters such as but not limited to Japanese, Chinese, and Korean. In addition, the typesetting control device 2a includes line leading device 7, which calculates the line leading of adjacent lines.

The display device 3 can be various types of display devices such as but not limited to a CRT or a LCD. The input device 5 can be a keyboard, a pointing device (e.g., a mouse, a track ball, and a track point), a scanner, or a communication interface. In addition, the output device 6 can be a printer and an external memory device. The DTP processing control device 2 can include a processor such as a CPU, a memory, or an electronic typesetting processing program that includes a line leading routine that is loaded into the memory and processed by a processor. Alternatively, the DTP processing control device 2 can also be implemented in part or in whole as hardware or firmware.

Figure 2:
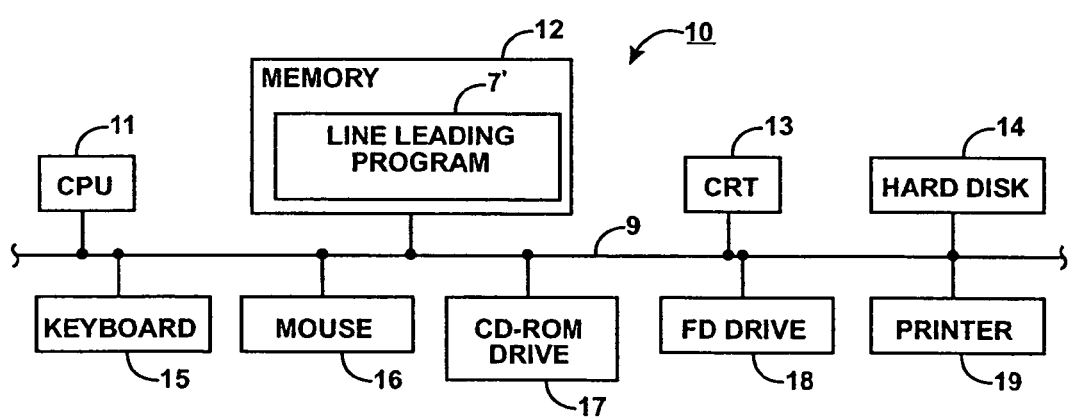
FIG. 2 shows another DTP system in accordance with the invention.

FIG. 2 shows a DTP system 10 that includes a line leading function in accordance with one aspect of the present invention, implemented in a general-purpose computer system. The system 10 shown in FIG. 2 has a CPU 11, a memory 12, a CRT 13, a hard disk 14, a keyboard 15, a mouse 16, a CD-ROM drive 17, a FD drive 18 and a printer 19. These units are coupled and work together through a bus 9. The system 10 includes a line leading program 7' as well as other electronic typesetting programs. Line leading program can be included in other electronic typesetting programs. The electronic typesetting programs, including the line leading program, are installed in system 10 by using CD-ROM drive 17 or FD drive 18, and are stored in memory such as hard disk 14, which can also store font file 2c. When the line leading program 7' or an electronic typesetting program containing the line leading program 7' is executed by a user operating keyboard 15 or mouse 16, the line leading program is loaded into memory 12 and executed by the CPU 11. In one implementation, a computer-readable recording medium (e.g., CD-ROM, FD, tape, or semiconductor memory) storing a line leading program is provided so that a general-purpose computer system can be converted into a DTP system providing a line leading function in accordance with the present invention.

FIG. 3 shows a line leading method 100 in accordance with the invention. As shown, a DTP system performing method 100 receives a document (step 302). The document can be any DTP document and includes multiple lines of glyphs. The line procession is from top to bottom. Alternatively, the line procession can be any combination of top to bottom, bottom to top, right to left, and left to right. Each line of glyphs in the document includes at least one glyph, which can represent any combination of a character, a symbol, and a blank space. Each glyph is framed in an embox which includes a preceding edge on the side of the preceding line of glyphs, which in this case is the top edge, and a following edge on the side of the following line of glyphs, which in this case is the bottom edge. As discussed, the dimension of the embox usually varies from font to font. The size of the embox is determined by the type size of the character represented by the glyph framed by the embox. The lines of glyphs in the document can follow either the Roman or the CJK line definitions.

The system receives an input selecting a line of glyphs in the document (step 304). The selected line is referred to as the current line of glyphs. Inputs to the system includes but are not limited to user inputs.

The system receives an input specifying a line leading metric (step 306). The line leading metric specifies a position, along the direction of a line procession, relative to an embox. This relative position can be thought of as a line parallel to the preceding and following edges of an embox. FIG. 3A shows an example of the described implementation of the line leading metric. In this example, the line procession is from top to bottom. In this implementation, the input specifies a line leading metric 301 that indicates a vertical position that is in the middle of the top and bottom edges 303 and 305 of embox 307. Alternatively, the line leading metric is any point, such as points 309 and 311, that can indicate vertical position relative to the embox 307.

As shown in FIG. 3, the system determines line leading values for the current and the immediately preceding lines of glyphs (step 308). For example, the line leading value of a line of glyphs can be set as the line leading value of the largest embox in the line of glyphs. Alternatively, the system can receive the line leading values from a user or a computer program that either stores default line leading values or calculates line leading values.

The system calculates the line height of the immediately preceding line of glyphs (step 310) by calculating the vertical distance between the preceding line and the following line of the immediately preceding line of glyphs. Alternatively, in systems having the CJK line definition, the system calculates line height by calculating the height of the largest embox in the line.

The system determines a line leading measure point of the immediately preceding line of glyphs (step 312). The line leading measure point of a current line of glyphs is a vertical position relative to the current line of glyph, from which a line leading ray (such as the line leading ray 902 of FIG. 9) can originate. This same vertical position also is the vertical position at which a line leading ray originating from an immediately preceding line of glyphs ends. That is, a line leading ray representing the distance between current and immediately preceding lines, originates at the line leading measure point of the immediately preceding line of glyphs and ends at the line leading measure point of the current line of glyphs.

To determine the line leading measure point, the system uses the line leading metric and the line height calculated. The system calculates the line leading measure point by locating the largest embox in the current line of glyphs and then determining the vertical position of this largest embox relative to the current line of glyphs. The embox position depends on the DTP convention being used. For Roman DTP line definitions, the top line of a current line of glyphs coincides with the base line of the emboxes in the immediately preceding line of glyphs and the bottom line of the current line of glyphs coincides with the baseline of the emboxes in the current line of glyphs. For CJK DTP line definitions, the top line of a line of glyphs coincides with the top edge of the largest embox in the current line of glyphs and the bottom line of the current line of glyphs coincides with the bottom edge of the largest embox. Once the largest embox is positioned correctly in the vertical direction, the system uses the line leading metric (which specifies a vertically position relative to this largest embox) to determine the position of the line leading measure point.

The system determines a line leading measure point of the current line of glyphs (step 314). To determine a line leading measure point of the current line, the system selects one of the line leading values received in step 308. For backward line leading models, the system selects the line leading value of the current line of glyphs. For forward line leading models, the system selects the line leading value of the immediately preceding line of glyphs. The system starts at the vertical position indicated by the line leading measure point of the immediately preceding line of glyphs and moves downward a distance corresponding to the selected largest line leading value to a new vertical position, which is the vertical position of the line leading measure point of the current line of glyphs.

The system calculates the line height of the current line of glyphs (step 316). The calculations involved in this step are similar to those in step 310 where the system calculates the line height for the immediately preceding line of glyphs.

The system calculates the position of the current line of glyphs (step 318). The system can perform this calculation because the system knows the vertical position of the line leading measure point of the current line of glyphs relative to the largest embox in the current line of glyphs. The line leading metric specifies this relationship. Furthermore, the system knows the vertical position of the current line relative to this largest embox.

FIGS. 4A–C illustrate one implementation of calculations performed in method 100. A DTP system receives a document and input specifying a current line of glyphs, from which the system selects an immediately preceding line of glyphs 400. As shown in FIG. 4A, this line of glyphs follows the CJK line definition and includes a top line 402 and a bottom line 404 as defined by the largest embox 406 contained in the line of glyphs 400. The system also receives input specifying a line leading metric that is 75 percent from the top edge 408 of the embox 406. From these input, the system calculates the vertical position of the line leading measure point for the immediately preceding line of glyphs 400. Specifically, the system calculates the vertical offset 410 between the top edge 408 and the line leading metric. The system then uses this offset 410 to locate the vertical position of the lead-line measuring point by starting at the top line 402 and moving downward a distance corresponding to the calculated offset 410. The vertical position of the line leading measure point for the immediately preceding line of glyphs 400 is shown as point 412. Figuratively, the system determines the lead-line measuring point by superimposing the largest embox 406 and its line leading metric over the immediately preceding line of glyphs 400.

As shown in FIG. 4B, the system then moves from point 412 downward a distance 414 corresponding to the line leading value of the immediately preceding line of glyphs (assuming but not limited to a forward line leading model). The resulting position, shown as point 416, is the line leading measure point of the current line of glyphs.

As shown in FIG. 4C, the system calculates the offset 418 between a top edge 420 of the largest embox 422 in the current line of glyphs. The system moves from point 416 a distance corresponding to the offset 418. This vertical position represents the vertical position of the top line of the current line of glyphs. This vertical position also represents the vertical position of the top edge 421 of the largest embox 422. Figuratively, the system is superimposing the largest embox 422 so that its line leading metric is at the same vertical position as the line leading measure point (represented by point 416) of the current line of glyphs. The top edge 421 of the largest embox 422 represents the vertical position of the top line of the current line of glyphs.

As shown in FIG. 4D, the system sets the top line 424 of the current line of glyphs at the vertical position calculated from the previous steps. To calculate the bottom line 426, the system starts at the vertical position of the top line 424 and moves down a distance 428 corresponding to the line height of the current line of glyphs to a vertical position that represents the bottom line of the current line of glyphs. The system has determined the position of the current line of glyphs 430.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. The essential elements of a computer are a processor for executing instructions and a memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, steps of the invention can be performed in a different order and still achieve desirable results. A DTP system in accordance with the invention is not limited to a forward line leading model but rather can support either a forward or backward line leading model. The line leading metric can specify any arbitrary point relative to an embox and is not limited to starting from an embox top and ending at an embox top. For example, the line leading metric can be changed so that the system measures line leading from current embox bottom to previous embox bottom, current embox top to previous embox top, or current embox center to previous embox center. The line leading metric can further specify an arbitrary point relative to an embox, including a relative point that is outside the embox. The described line leading technique applies to line setting in any direction, including but not limited to horizontal and vertical line settings. The described line leading technique applies in any line procession direction, including but not limited to line procession from top to bottom, from bottom to top, from left to right, and from right to left. The system can determine a line leading measure point of an immediately preceding line of glyphs in any manner, including calculating an offset between the top of an embox and a line leading metric, calculating an offset between the bottom of an embox and a line leading metric, calculating an offset between the middle of an embox and a line leading metric, and calculating an offset between any point relative to an embox and the line leading metric. Once the system has determined the line leading measure point of the current line of glyphs, the system can calculate the position of a current line of glyphs in any manner, including calculating an offset between the top of an embox and a line leading metric, calculating an offset between the bottom of an embox and a line leading metric, calculating an offset between the middle of an embox and a line leading metric, and calculating an offset between any point relative to an embox and the line leading metric.

What is claimed is:

1. A method for calculating a position of a current line of glyphs relative to an immediately preceding line of glyphs in the electronic typesetting of a document, the method comprising:

receiving an electronic document containing lines of glyphs, each line of glyphs including at least one glyph, each glyph being contained in an embox having a preceding edge and a following edge, the embox having a size determined by a type size of a character represented by the glyph, wherein a line of glyphs includes a preceding line defined to coincide and be parallel with the preceding edge of a largest embox of the line of glyphs, a following line defined to coincide and be parallel with the following edge of the largest embox of the line of glyphs, and a line height defined to be a distance between the preceding line and the following line of the line of glyphs;

receiving an input specifying a line leading metric, which represents a reference point relative to an embox;

receiving a line leading value for the current line of glyphs and a line leading value for the immediately preceding lines of glyphs;

calculating the line height of the immediately preceding line of glyphs;

calculating a position of a line leading measure point of the immediately preceding line of glyphs from the line leading metric and from the line height of the immediately preceding line of glyphs;

calculating a position of a line leading measure point of the current line of glyphs from one of the line leading values received and from the calculated position of the line leading measure point of the immediately preceding line of glyphs;

calculating the line height of the current line of glyphs; and calculating the position of the current line of glyphs from the line leading metric, the line height of the current line of glyphs, and the calculated position of the line leading measure point of the current line of glyphs.

2. The method of claim 1, wherein receiving an input includes receiving an input specifying a line leading metric that is at a middle of an embox's preceding and following edges.

3. The method of claim 1, wherein receiving an input includes receiving an input specifying a line leading metric that is at the following edge of an embox.

4. The method of claim 1, wherein receiving an input includes receiving an input specifying a line leading metric that is at a point between and including the preceding and following edges of an embox.

5. The method of claim 1, wherein calculating a position of a line leading measure point of the current line of glyphs includes:

starting from the position of the line leading measure point of the immediately preceding line of glyphs; and moving in a direction of the line procession a distance corresponding to the leading value of the current line of glyphs.

6. The method of claim 5, wherein there can be an offset between the following line of a line of glyphs and the line leading metric specified by the input, and wherein calculating the position of the current line of glyphs includes:

calculating the offset, if any, for the current line of glyphs;

starting from the position of the line leading measure point of the current line of glyphs;

moving in the direction of the line procession a distance corresponding to the offset calculated; and moving opposite to the direction of the line procession upward a distance corresponding the line height of the current line of glyphs.

7. The method of claim 1, wherein calculating a position of a line leading measure point of the current line of glyphs includes:

starting from the position of the line leading measure point of the immediately preceding line of glyphs; and moving in a direction of the line procession a distance corresponding to the leading value of the immediately preceding line of glyphs.

8. The method of claim 6, wherein there can be an offset between the following line of a line of glyphs and the line leading metric specified by the input, and wherein calculating the position of the current line of glyphs includes:

calculating the offset, if any, for the current line of glyphs;

starting from the position of the line leading measure point of the current line of glyphs;

moving in the direction of the line procession a distance corresponding to the offset calculated; and moving opposite to the direction of the line procession upward a distance corresponding the line height of the current line of glyphs.

9. A method for calculating line leading in the electronic typesetting of a document, comprising:

receiving a first input expressly specifying either a forward line leading model or a backward line leading model; and calculating the line leading according to the forward line leading model if the first input specifies the forward line leading model and otherwise calculating the line leading according to the backward line leading model if the first input specifies the backward line leading model, where the line leading determines a position of a current line of glyphs relative to an immediately preceding line of glyphs in the typesetting of the document.

10. The method of claim 9, wherein line leading determines a position of a current line of glyphs relative to an immediately preceding line of glyphs, and wherein calculating line leading includes:

receiving an electronic document containing lines of glyphs, each line of glyphs including at least one glyph, each glyph being contained in an embox having a preceding edge and a following edge, the embox having a size determined by a type size of a character represented by the glyph, wherein a line of glyphs includes a preceding line defined to coincide and be parallel with the preceding edge of a largest embox of the line of glyphs, a following line defined to coincide and be parallel with the following edge of the largest embox of the line of glyphs, and a line height defined to be a distance between the preceding line and the following line of the line of glyphs;

receiving a second input specifying a line leading metric, which represents a reference point relative to an embox;

receiving a line leading value for the current line of glyphs and a line leading value for the immediately preceding lines of glyphs;

calculating the line height of the immediately preceding line of glyphs;

calculating a position of a line leading measure point of the immediately preceding line of glyphs from the line leading metric and from the line height of the immediately preceding line of glyphs;

calculating a position of a line leading measure point of the current line of glyphs from one of the line leading values received and from the calculated position of the line leading measure point of the immediately preceding line of glyphs;

calculating the line height of the current line of glyphs; and calculating the position of the current line of glyphs from the line leading metric, the line height of the current line of glyphs, and the calculated position of the line leading measure point of the current line of glyphs.

11. The method of claim 10, wherein calculating the position of the line leading measure point of the current line of glyphs includes:
  starting from the position of the line leading measure point of the immediately preceding line of glyphs; and
  when the first input specifies a backward line leading model, moving in a direction of the line procession a distance corresponding to the leading value of the current line of glyphs.

12. The method of claim 10, wherein calculating the position of the line leading measure point of the current line of glyphs include:
  starting from the position of the line leading measure point of the immediately preceding line of glyphs; and
  when the first input specifies a forward line leading model, moving in a direction of the line procession a distance corresponding to the leading value of the previous line of glyphs.

13. A computer program product, tangibly stored on a computer-readable medium, for calculating a position of a current line of glyphs relative to an immediately preceding line of glyphs in the electronic typesetting of a document, comprising instructions operable to cause a programmable processor to:
  receive an electronic document containing lines of glyphs, each line of glyphs including at least one glyph, each glyph being contained in an embox having a preceding edge and a following edge, the embox having a size determined by a type size of a character represented by the glyph, wherein a line of glyphs includes a preceding line defined to coincide and be parallel with the preceding edge of a largest embox of the line of glyphs, a following line defined to coincide and be parallel with the following edge of the largest embox of the line of glyphs, and a line height defined to be a distance between the preceding line and the following line of the line of glyphs;
  receive an input specifying a line leading metric, which represents a reference point relative to an embox;
  receive a line leading value for the current line of glyphs and a line leading value for the immediately preceding lines of glyphs;
  calculate the line height of the immediately preceding line of glyphs;
  calculate a position of a line leading measure point of the immediately preceding line of glyphs from the line leading metric and from the line height of the immediately preceding line of glyphs;
  calculate a position of a line leading measure point of the current line of glyphs from one of the line leading values received and from the calculated position of the line leading measure point of the immediately preceding line of glyphs;
  calculate the line height of the current line of glyphs; and
  calculate the position of the current line of glyphs from the line leading metric, the line height of the current line of glyphs, and the calculated position of the line leading measure point of the current line of glyphs.

14. The computer program product of claim 13, further comprising instructions to:
  receive an input specifying a line leading metric that is at a middle of an embox's preceding and following edges.

15. The computer program product of claim 13, further comprising instructions to:
  receive an input specifying a line leading metric that is at the following edge of an embox.

16. The computer program product of claim 13, further comprising instructions to:
  receive an input specifying a line leading metric that is at a point between and including the preceding and following edges of an embox.

17. The computer program product of claim 13, wherein instructions for calculating a position of a line leading measure point of the current line of glyphs includes instructions to:
  start from the position of the line leading measure point of the immediately preceding line of glyphs; and
  move in a direction of the line procession a distance corresponding to the leading value of the current line of glyphs.

18. The computer program product of claim 17, wherein there can be an offset between the following line of a line of glyphs and the line leading metric specified by the input, and wherein instruction for calculating a position of the current line of glyphs further includes instructions to:
  calculate the offset, if any, for the current line of glyphs;
  start from the position of the line leading measure point of the current line of glyphs;
  move in the direction of the line procession a distance corresponding to the offset calculated; and
  move opposite to the direction of the line procession upward a distance corresponding the line height of the current line of glyphs.

19. The computer program product of claim 13, wherein instructions for calculating a position of a line leading measure point of the current line of glyphs includes instructions to:
  start from the position of the line leading measure point of the immediately preceding line of glyphs; and
  move in a direction of the line procession a distance corresponding to the leading value of the immediately preceding line of glyphs.

20. The computer program product of claim 18, wherein there can be an offset between the following line of a line of glyphs and the line leading metric specified by the input, and wherein instructions for calculating the position of the current line of glyphs further includes instructions to:
  calculate the offset, if any, for the current line of glyphs;
  start from the position of the line leading measure point of the current line of glyphs;
  move in the direction of the line procession a distance corresponding to the offset calculated; and
  move opposite to the direction of the line procession upward a distance corresponding the line height of the current line of glyphs.

21. A computer program product, tangibly stored on a computer-readable medium, for calculating line leading in the electronic typesetting of a document, comprising instructions operable to cause a programmable processor to:
  receive a first input expressly specifying either a forward line leading model or a backward line leading model; and
  calculate the line leading according to the forward line leading model if the first input specifies the forward line leading model and otherwise calculate the line leading according to the backward line leading model if the first input specifies the backward line leading model, where the line leading determines a position of a current line of glyphs relative to an immediately preceding line of glyphs in the typesetting of the document.

22. The computer program product of claim 21, wherein line leading determines a position of a current line of glyphs relative to an immediately preceding line of glyphs, and wherein instructions to calculate line leading includes instructions to:
- receive an electronic document containing lines of glyphs, each line of glyphs including at least one glyph, each glyph being contained in an embox having a preceding edge and a following edge, the embox having a size determined by a type size of a character represented by the glyph, wherein a line of glyphs includes a preceding line defined to coincide and be parallel with the preceding edge of a largest embox of the line of glyphs, a following line defined to coincide and be parallel with the following edge of the largest embox of the line of glyphs, and a line height defined to be a distance between the preceding line and the following line of the line of glyphs;
- receive a second input specifying a line leading metric, which represents a reference point relative to an embox;
- receive a line leading value for the current line of glyphs and a line leading value for the immediately preceding lines of glyphs;
- calculate the line height of the immediately preceding line of glyphs;
- calculate a position of a line leading measure point of the immediately preceding line of glyphs from the line leading metric and from the line height of the immediately preceding line of glyphs;
- calculate a position of a line leading measure point of the current line of glyphs from one of the line leading values received and from the calculated position of the line leading measure point of the immediately preceding line of glyphs;
- calculate the line height of the current line of glyphs; and
- calculate the position of the current line of glyphs from the line leading metric, the line height of the current line of glyphs, and the calculated position of the line leading measure point of the current line of glyphs.

23. The computer program product of claim 22, wherein line leading determines a position of a current line of glyphs relative to an immediately preceding line of glyphs, and wherein instructions for calculating the line leading measure point includes instructions to:
- start from the position of the line leading measure point of the immediately preceding line of glyphs; and
- when the first input specifies a backward line leading model, move in a direction of the line procession a distance corresponding to the leading value of the current line of glyphs to locate.

24. The computer program product of claim 22, wherein instructions for calculating the line leading measure point includes instructions to:
- start from the position of the line leading measure point of the immediately preceding line of glyphs; and
- when the first input specifies a forward line leading model, move in a direction of the line procession a distance corresponding to the leading value of the previous line of glyphs.

25. A system for calculating line leading, comprising:
- a line leading device operable to perform line leading under both a forward line leading model and a backward line leading model, where in response to a first input expressly specifying either a forward line leading model or a backward line leading model, the line leading device:
  - calculates the line leading according to the forward line leading model if the first input specifies the forward line leading model and otherwise calculates the line leading according to the backward line leading model if the first input specifies the backward line leading model, where the line leading determines a position of a current line of glyphs relative to an immediately preceding line of glyphs in the typesetting of the document.

* * * * *

UNITED STATES PATENT AND TRADEMARK OFFICE
CERTIFICATE OF CORRECTION

PATENT NO. : 7,167,274 B2  Page 1 of 1
APPLICATION NO. : 09/967865
DATED : January 23, 2007
INVENTOR(S) : Nathaniel M. McCully It is certified that error appears in the above-identified patent and that said Letters Patent is hereby corrected as shown below:

Column 9, line 61, (claim 6) replace the phrase "corresponding the line height" with -- corresponding to the line height--;

Column 10, line 14, (claim 8) replace the phrase "corresponding the line height" with -- corresponding to the line height--;

Column 12, line 20, (claim 18) replace the word "instruction" with -- instructions--;

Column 12, line 28, (claim 18) replace the phrase "corresponding the line height" with -- corresponding to the line height--;

Column 12, line 50, (claim 20) replace the phrase "corresponding the line height" with -- corresponding to the line height--;

Signed and Sealed this

Fifth Day of June, 2007

JON W. DUDAS
*Director of the United States Patent and Trademark Office*